United States Patent
Kawamoto et al.

(10) Patent No.: US 6,225,597 B1
(45) Date of Patent: May 1, 2001

(54) METHOD OF CONTROLLING PULSE OUTPUT AND CONSUMABLE ELECTRODE TYPE PULSE ARC WELDING DEVICE

(75) Inventors: Atsuhiro Kawamoto; Koji Hamamoto, both of Hyogo; Yoshiaki Tanaka, Osaka; Akira Nakagawa, Hyogo, all of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/333,853

(22) Filed: Jun. 15, 1999

(30) Foreign Application Priority Data

Jun. 17, 1998 (JP) .................................................. 10-169655

(51) Int. Cl.$^7$ ................................................. B23K 9/09
(52) U.S. Cl. ............................... 219/130.51; 219/130.21; 219/130.31
(58) Field of Search .......................... 219/130.51, 137 PS, 219/130.21, 130.01, 130.31, 130.32, 130.33

(56) References Cited

FOREIGN PATENT DOCUMENTS

1-60351  12/1989  (JP) .

*Primary Examiner*—Clifford C. Shaw
(74) *Attorney, Agent, or Firm*—Pearne & Gordon LLP (57) ABSTRACT

When a welding voltage is lowered, a pulse period is shortened or a peak current is reduced so that an average of a pulse frequency is not changed. Therefore, short circuit is regularly generated and a quantity of generated spatter is reduced. When the welding voltage is changed immediately before a melting drop separates from a tip of a wire, separation of the melting drop is predicted and the pulse period is ended. Due to the foregoing, a melting drop is regularly shifted at each pulse, and a quantity of generated spatter is reduced.

13 Claims, 8 Drawing Sheets

SHORT CIRCUIT

METHOD OF CONTROLLING PULSE OUTPUT AND CONSUMABLE ELECTRODE TYPE PULSE ARC WELDING DEVICE

BACKGROUND OF THE INVENTION

1. Field of the Invention

The present invention relates to a method of controlling a welding output and also relates to a consumable electrode type pulse arc welding device in which a consumable electrode, which will be referred to as a wire hereinafter, is automatically fed, and a peak current and a base current are alternately and repeatedly supplied between the wire and a welding base metal which will be referred to as a base metal hereinafter.

2. Description of the Related Art

Figure 10:
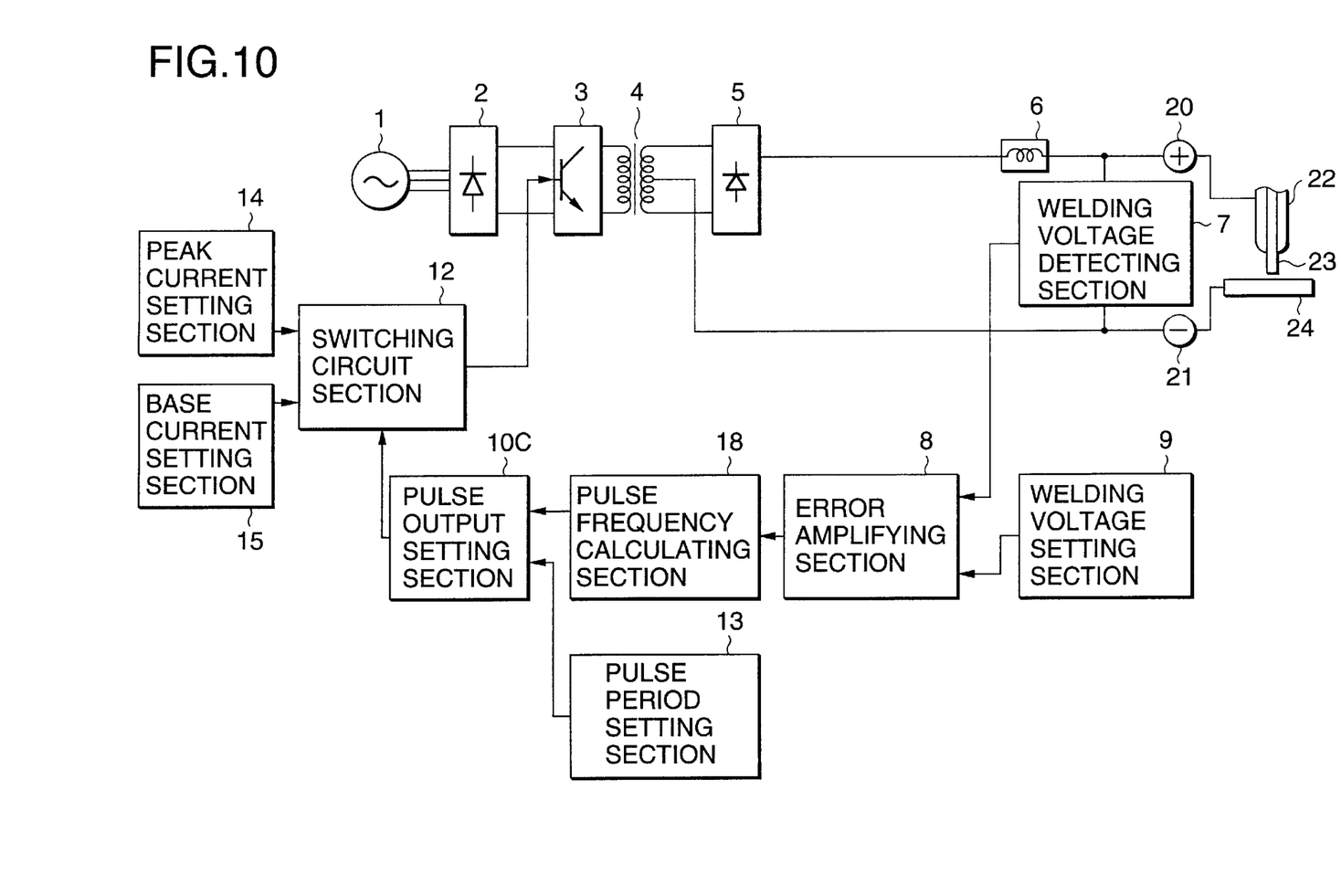
FIG. 10 is a circuit diagram showing an embodiment of the consumable electrode type arc welding device to which the conventional method of controlling a pulse output is applied.
Figure 11:
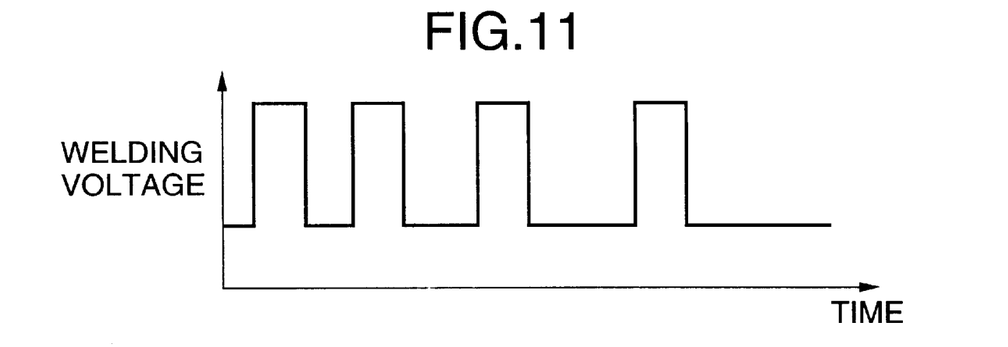
FIG. 11 is a waveform diagram of welding voltage in the case where the conventional method of controlling a pulse output is used and welding is conducted under the condition which is most appropriate for one pulse and one drop.

FIG. 10 is a view showing an example of the conventional method of controlling an output of a consumable electrode type pulse arc welder. According to the above conventional method, an output of the pulse arc welder is controlled by fixing a pulse period and changing a pulse frequency. This pulse period is set at the most appropriate value so that a melting drop can be formed at a tip of a wire each time a peak current is outputted and the thus formed melting drop can be separated from the tip of the wire by an electromagnetic pinching force caused by the peak current and shifted to a base metal. Therefore, as shown in FIG. 11, under the outputting condition of one pulse and one drop, the occurrence of short circuit is suppressed and spattering is seldom caused during a process of welding.

Next, referring to FIG. 10, a structure of the conventional consumable electrode type pulse arc welding device will be explained below. In FIG. 10, reference numeral 1 is a three-phase input power source, reference numeral 2 is a first rectifying section, reference numeral 3 is an inverter circuit, reference numeral 4 is a main transformer, reference numeral 5 is a second rectifying section, reference numeral 6 is a reactor, reference numeral 20 is a positive output terminal, reference numeral 21 is a negative output terminal, reference numeral 22 is a chip, reference numeral 23 is a wire, and reference numeral 24 is a base metal. An error caused between an output of the welding voltage detecting section 7 and an output of the welding voltage setting section 9 is amplified by the error amplifying section 8. By an output of this error amplifying section 8, a pulse frequency signal is outputted by the pulse frequency calculating section 18. By this pulse frequency signal and an output of the pulse period setting section 13 for setting a pulse period, a frequency appropriate for a welding output and a signal corresponding to the pulse period are obtained in the pulse output setting section 10c.

Figure 12:
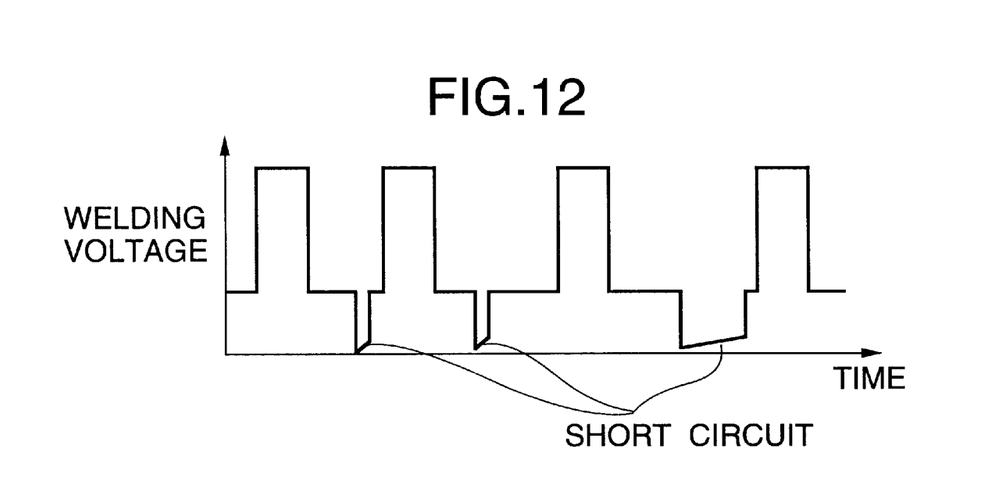
FIG. 12 is a view showing a state in which a melting drop is shifted and a waveform diagram showing a waveform of welding voltage in the case where welding is conducted under the condition that the welding voltage is reduced, by the conventional method of controlling a pulse output.

When the most appropriate period for one pulse and one drop is set as described above, it is possible to suppress the occurrence of spattering. However, in recent years, there is a growing tendency of increasing a welding speed so that the productivity of welding can be enhanced. In order to increase the welding speed, it is necessary to lower a welding voltage. When the welding voltage is lowered, a pulse period is not changed according to the conventional controlling method as shown in FIG. 12. Therefore, an average of the pulse frequency is lowered. However, a quantity of a wire to be fed is constant. Accordingly, although the most appropriate period for one pulse and one drop has been set, short circuit occurs before a melting drop is separated from a wire tip because the pulse frequency lacks with respect to the quantity of wire to be fed. Further, a size of the melting drop which has been left at the tip of the wire is not uniform. Therefore, frequency of the occurrence of short circuit becomes irregular. For the above reasons, a quantity of generated spatter is increased, and the thus generated spatter adheres to the base metal and the nozzle, which impairs the enhancement of productivity.

SUMMARY OF THE INVENTION

The present invention has been accomplished to solve the above problems with the prior art, and therefore one object of the present invention is to provide a method of controlling a pulse output and a consumable electrode type pulse arc welding device in which short circuit is regularly caused at each pulse so that a quantity of generated spatter can be reduced.

Another object of the present invention is to provide a method of controlling a pulse output and a consumable electrode type pulse arc welding device in which short circuit is regularly caused at each pulse so that a quantity of generated spatter can be suppressed when the peak current is lowered so that an average of the pulse frequency can not be changed in the case of lowering the welding voltage.

Still another object of the present invention is provide a method of controlling a pulse output and a consumable electrode type pulse arc welding device in which a melting drop is be regularly shifted from the tip of the wire to the base metal at each pulse due to the foregoing so that a quantity of generated spatter can be reduced, since according to the invention, when a welding voltage, which changes immediately before the separation of a melting drop from the tip of the wire, is detected, separation of the melting drop is predicted, and the pulse period is ended.

In order to accomplish the above object, according to a first aspect of the invention, there is provided a method of controlling a pulse output, comprising the step of: setting a period of a pulse of a current by using at least one of a welding output voltage, a signal corresponding to the welding output voltage and a setting welding voltage. When a period of a pulse is set, the period of a pulse of a current is set by using at least one of a welding output voltage, a signal corresponding to the welding output voltage and a setting welding voltage and also by using a setting pulse frequency. Concerning this period of a pulse, an upper limit and a lower limit of the period of a pulse of a current are set according to at least one of a quantity of a wire to be fed, a diameter of the wire and a material of the wire. Next, a consumable electrode type pulse arc welding device to which the method of controlling a pulse output is applied will be explained below.

According to another aspect of the invention, there is provided a consumable electrode type pulse arc welding device comprising: a welding voltage detecting section for detecting a welding voltage; a welding voltage setting section for setting a welding voltage; a main transformer for supplying electric power to a welding load, having an auxiliary coil on the secondary side; a rectifying element for rectifying an output of the main transformer; an error amplifying section for amplifying a difference between two inputs, one input being an output of the welding voltage detecting section or an output of the rectifying element, the other input being an output of the welding voltage setting section; a pulse frequency setting section for setting a pulse frequency to calculate a period of a pulse; a pulse output setting section for outputting a pulse output signal corresponding to a welding output from an output of the welding voltage detecting section or an output of the rectifying element, an output of the welding voltage setting section, an output of the pulse frequency setting section, and an output of the error amplifying section; a peak current setting section for setting a peak current; a base current setting section for setting a base current; and a switching circuit section for selecting either an output of the peak current setting section or an output of the base current setting section by an output of the pulse output setting section.

According to still another object of the invention, there is provided a method of controlling a pulse output, comprising the step of: setting a peak current by using at least one of a welding output voltage, a signal corresponding to the welding output voltage and a setting welding voltage and also by using a setting pulse frequency.

According to yet still another object of the invention, there is provided a consumable electrode type pulse arc welding device comprising: a welding voltage detecting section for detecting a welding voltage; a welding voltage setting section for setting a welding voltage; a main transformer for supplying electric power to a welding load, having an auxiliary coil on the secondary side; a rectifying element for rectifying an output of the main transformer; an error amplifying section for amplifying a difference between two inputs, one input being an output of the welding voltage detecting section or an output of the rectifying element, the other input being an output of the welding voltage setting section; a pulse frequency setting section for setting a pulse frequency to calculate a peak current; a pulse period setting section for setting a pulse period; a peak current calculating section for setting a peak current while at least one of an output of the welding voltage detecting section, an output of the rectifying element and an output of the welding voltage setting section, an output of the pulse period setting section and an output of the pulse frequency setting section are used as an input; a base current setting section for setting a base current; and a switching circuit section for selecting either an output of the peak current calculating section or an output of the base current setting section by an output of the pulse output setting section.

According to yet still another aspect of the invention, there is provided a method of controlling a pulse output, comprising the steps of: detecting a melting drop separation predicting signal for predicting separation of a melting drop from a tip of a wire by the welding output voltage; and setting a pulse period by using this melting drop separation predicting signal as a signal to determine a time at which the pulse period is ended.

According to yet still another aspect of the invention, there is provided a consumable electrode type pulse arc welding device, comprising: a welding voltage detecting section for detecting a welding voltage; a comparing section for outputting a melting drop separation predicting signal when an output of the welding voltage detecting section and an output of the voltage setting section are compared and calculated and the output of the welding voltage detecting section exceeds the output of the voltage setting section; a welding voltage setting section for setting a welding voltage; a main transformer for supplying electric power to a welding load, having an auxiliary coil on the secondary side; a rectifying element for rectifying an output of the main transformer; an error amplifying section for amplifying a difference between two inputs, one input being an output of the welding voltage detecting section or an output of the rectifying element, the other input being an output of the welding voltage setting section; a pulse frequency calculating section for setting a pulse frequency when an output of the error amplifying section is used as an input; a pulse output setting section for outputting a pulse output signal corresponding to a welding output by using an output of the comparing section and an output of the pulse frequency calculating section as an input, also by using an output of the pulse frequency calculating section as a peak period starting signal and also by using an output of the comparing section as a peak period ending signal; a peak current setting section for setting a peak current; a base current setting section for setting a base current; and a switching circuit section for selecting either an output of the peak current setting section or an output of the base current setting section by an output of the pulse period setting section.

The above peak current setting section for setting a peak current of the consumable electrode type pulse arc welding device is set according to at least one of the settings of a quantity of a wire to be fed, a material of the wire and a diameter of the wire.

DETAILED DESCRIPTION OF THE PREFERRED EMBODIMENTS

According to the present invention, in a method of controlling a pulse output and the consumable electrode type pulse arc welding device, a pulse period is set by using at least one of a welding output voltage, a signal corresponding to the welding output voltage and a setting welding voltage. When the pulse period is set, at least one of a welding output voltage, a signal corresponding to the welding output voltage and a setting welding voltage is used, and a setting pulse frequency is also used. Concerning the pulse period, an upper limit and a lower limit are set according to one of the quantity of a wire to be fed, the diameter of the wire and the material of the wire. That is, according to the method of controlling a pulse output and the consumable electrode type pulse arc welding device, when the welding voltage is lowered, the pulse period is set so that an average of the pulse frequency is not changed. Due to the foregoing, short circuit, which is caused each time the welding voltage is lowered, is regularly generated at each pulse, so that a quantity of generated spatter can be reduced. In the pulse output setting section, there is provided a limiter setting section by which an upper limit and a lower limit of the pulse period are set according to at least one of the quantity of a wire to be fed, the diameter of the wire and the material of the wire. When this limiter setting section is provided in the pulse output setting section, welding is stabilized. The pulse frequency setting section to set a pulse frequency used for calculating a pulse period can be set according to at least one of the quantity of a wire to be fed, the diameter of the wire and the material of the wire. Therefore, it is possible to extend a range of setting.

Also, according to the invention, in the method of controlling a pulse output and the consumable electrode type pulse arc welding device, a peak current is set by using at least one of the welding output voltage, the signal corresponding to the welding output voltage and the setting welding voltage and also by using the setting pulse frequency. When the welding voltage is lowered, the peak current is lowered so that an average of the pulse frequency is not changed. Due to the foregoing, short circuit is regularly generated at each pulse, so that a quantity of generated spatter can be reduced. The pulse period setting section for setting a pulse period can be set according to at least one of the quantity of a wire to be fed, the diameter of the wire and the material of the wire. The pulse frequency setting section to set a pulse frequency of the consumable electrode type pulse arc welding device of the second invention can be set according to at least one of the quantity of a wire to be fed, the diameter of the wire and the material of the wire. Therefore, it is possible to extend a range of setting.

According to the invention, in a method of controlling a pulse output and the consumable electrode type pulse arc welding device, in a melting drop separation predicting signal for predicting a separation of a drop from a tip of a wire is detected by the welding output voltage, and a pulse period is set by using this drop separation predicting signal as a signal to determine a time at which the pulse period is ended. That is, when separation of the melting drop from the tip of the wire is predicted and the pulse period is ended, the melting drop can be regularly shifted from the tip of the wire to the base metal at each pulse, so that a quantity of generated spatter can be reduced.

The base current setting section of the consumable electrode type pulse arc welding device of the first, the second and the third invention is set according to one of the quantity of the wire to be fed, the material of the wire and the diameter of the wire. Therefore, setting can be conducted for each of the quantity of the wire to be fed, the material of the wire and the diameter of the wire. Therefore, it is possible to extend a range of setting.

The peak current setting section of the consumable electrode type pulse arc welding device of the first and the third invention is set according to one of the quantity of the wire to be fed, the material of the wire and the diameter of the wire. Therefore, setting can be conducted for each of the quantity of the wire to be fed, the material of the wire and the diameter of the wire. Therefore, it is possible to extend a range of application.

Now, a description will be given in more detail of preferred embodiments of the invention with reference to the accompanying drawings.

(FIRST EMBODIMENT)

Figure 1:
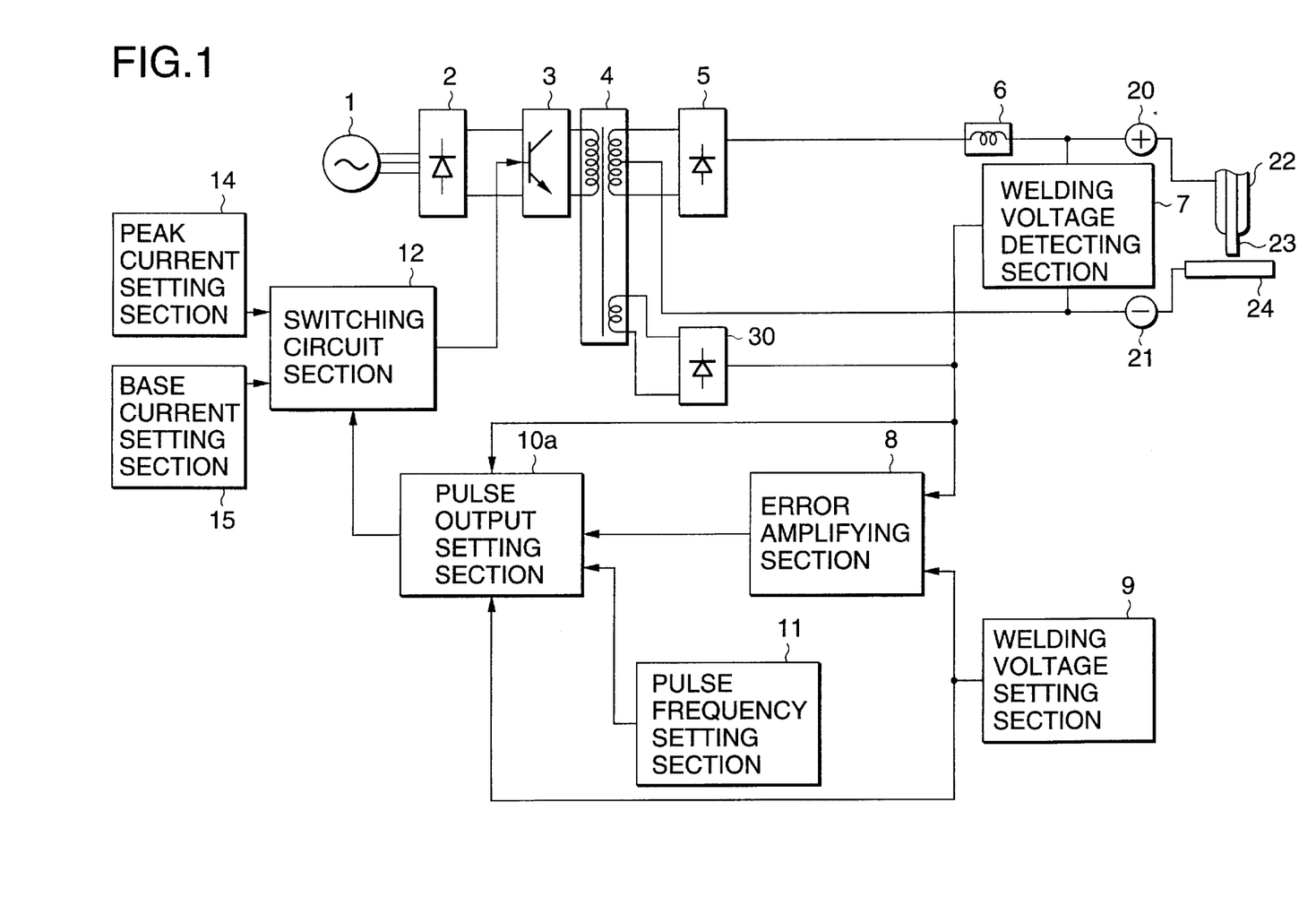
FIG. 1 is a circuit diagram showing an embodiment of the consumable electrode type arc welding device to which the first method of controlling a pulse output of the present invention is applied.
Figure 7:
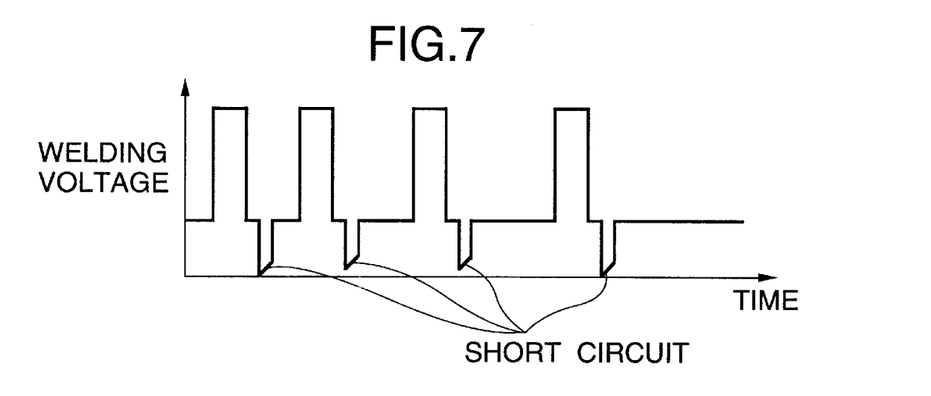
FIG. 7 is a waveform diagram showing a waveform of welding voltage in the case where welding is conducted under the condition that the welding voltage is reduced, by the consumable electrode type arc welding device to which the first method of controlling a pulse output of the present invention is applied.

Referring to FIGS. 1 and 7, the consumable electrode type pulse arc welding device, to which the method of controlling a pulse output of the first invention is applied, will be explained below. In this connection, like reference characters are used to indicate like parts in the conventional structure and the structure of this embodiment, and the explanation is omitted here.

The consumable electrode type pulse arc welding device of the first embodiment includes: a main transformer 4 for supplying electric power to a welding load, having an auxiliary coil on the secondary side; a welding voltage detecting section 7 for detecting a welding voltage; a rectifying element 30 for rectifying an output of the main transformer; a welding voltage setting section 9 for setting a welding voltage; and an error amplifying section 8 for amplifying a difference between two inputs, one input being an output of the welding voltage detecting section 7 or an output of the rectifying element 30, the other input being an output of the welding voltage setting section 9, wherein an average welding voltage VOUT obtained by using at least one of the output of the welding voltage detecting section 7, the output of the rectifying element 30 and the output of the welding voltage setting section 9, a welding voltage VP in the peak period from the output of the welding voltage detecting section 7 or the output of the rectifying element 30, and a welding voltage VB in the base period, are detected by the voltage detecting section in the pulse output setting section 10a not shown in the drawing, and from an output PF of the pulse frequency setting section 11 for setting a pulse frequency and also from VOUT, VP and VB, the pulse period is calculated by the pulse period calculating section in the pulse output setting section 10a not shown so that an average of the pulse frequency can not be changed. In this connection, VP and VB may be given as data, however, the pulse period may be calculated without using VP and VB. The pulse period may be set as a data table without conducting calculation. The pulse output setting section 10a outputs a pulse output signal corresponding to a welding output while a pulse frequency, which is set by the output of the error amplifying section 8, and the pulse period are combined with each other. Then, either the output of the peak current setting section for setting a peak current or the output of the base current setting section for setting a base current is switched in the switching circuit by the output of the pulse output setting section.

FIG. 7 is a diagram showing a waveform of the welding voltage in the case where welding is conducted by the consumable electrode type pulse arc welding device of the first embodiment. The waveform of the welding voltage shown in FIG. 7 shows a welding voltage waveform in the case where the setting welding voltage is lowered from a welding condition of one pulse and one drop shown in FIG. 11, that is, a welding condition in which no short circuit occurs. These views are made on the assumption that the welding loads are the same. When it is assumed that the welding loads are changed, FIGS. 7 and 11 show a condition in which the pulse frequency of the welding voltage waveform is decreased.

Figure 4:
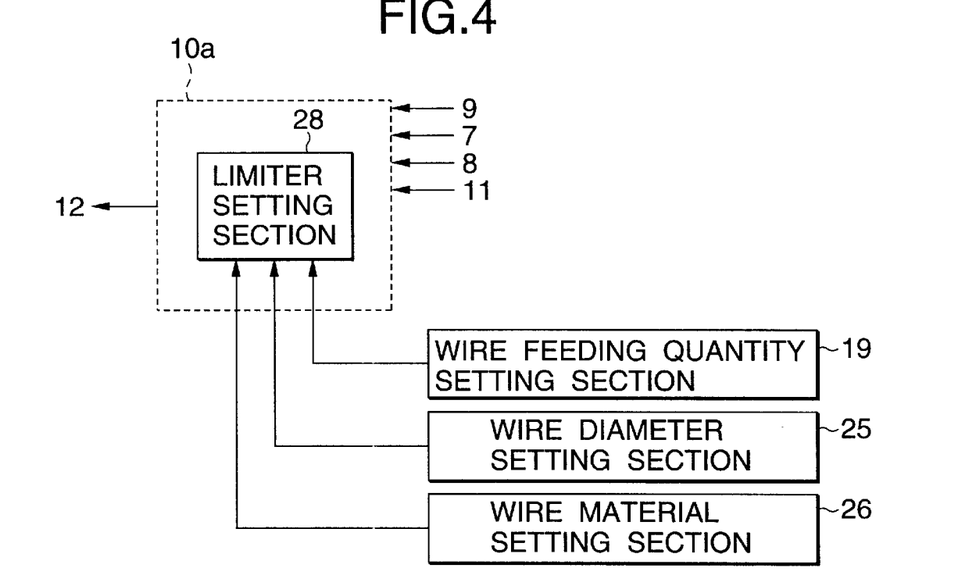
FIG. 4 is a circuit diagram showing an embodiment of the pulse period setting section in the consumable electrode type arc welding device to which the method of controlling a pulse output of the present invention is applied.

In the case where the setting welding voltage is lowered from the condition shown in FIG. 11, it can be understood that the pulse frequency is the same as that before setting welding voltage is changed when the pulse period is reduced. In this case, the pulse period is reduced to be shorter than the most appropriate value for one pulse and one drop. Therefore, it is impossible to provide a welding condition of one pulse and one drop. However, since a melting drop, the quantity of which is constant, is formed at a tip of a wire at each pulse, short circuit is caused each time the pulse period is ended. Therefore, a constant quantity of a melting drop is shifted from the tip of the wire to the base metal. That is, in the case where the welding voltage is lowered, a melting drop at the tip of the wire is not separated, however, a size of the melting drop which has been left at the tip of the wire becomes uniform. Therefore, the A melting drop is regularly shifted from the tip of the wire to the base metal according to the short circuit which occurs after the end of the pulse period. Even when the welding voltage is lowered, an average of the pulse frequency is not changed. Therefore, a quantity of a melting drop which shifted from the tip of the wire to the base metal at each pulse is the same as that of the welding condition of one drop and one pulse, that is, the welding condition in which the welding voltage is high. Due to the foregoing, the generation of spatter is suppressed and welding can be stabilized. As shown in FIG. 4, in the pulse output setting section 10a, there is provided a limiter setting section by which an upper limit and a lower limit of the pulse period are set according to at least one of the quantity of a wire to be fed, the diameter of the wire and the material of the wire. When this limiter setting section is provided in the pulse output setting section, it is possible to prevent a pulse period, which is not appropriate for welding, from being set. Therefore, welding can be stabilized.

(SECOND EMBODIMENT)

Figure 2:
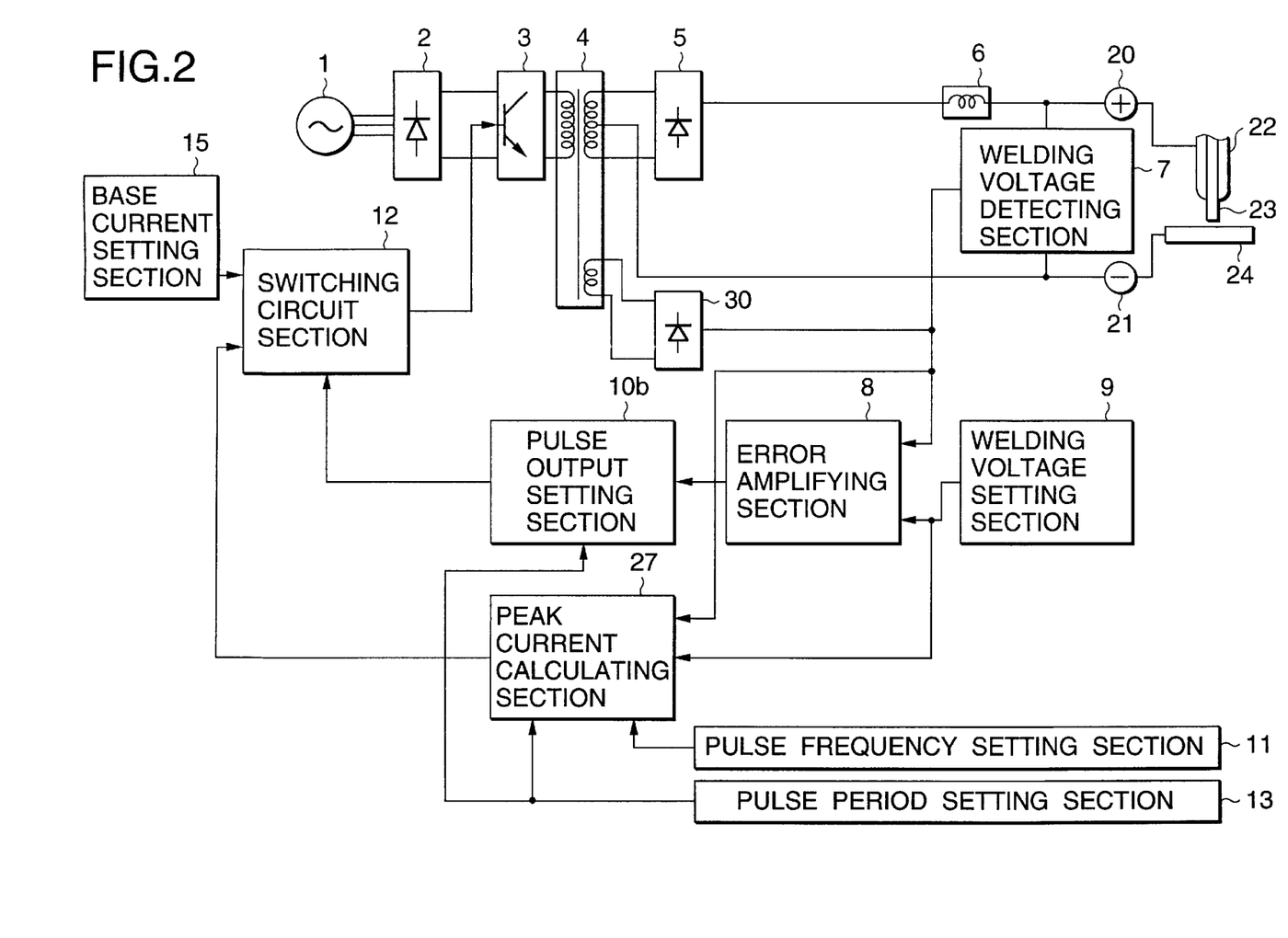
FIG. 2 is a circuit diagram showing an embodiment of the consumable electrode type arc welding device to which the second method of controlling a pulse output of the present invention is applied.
Figure 8:
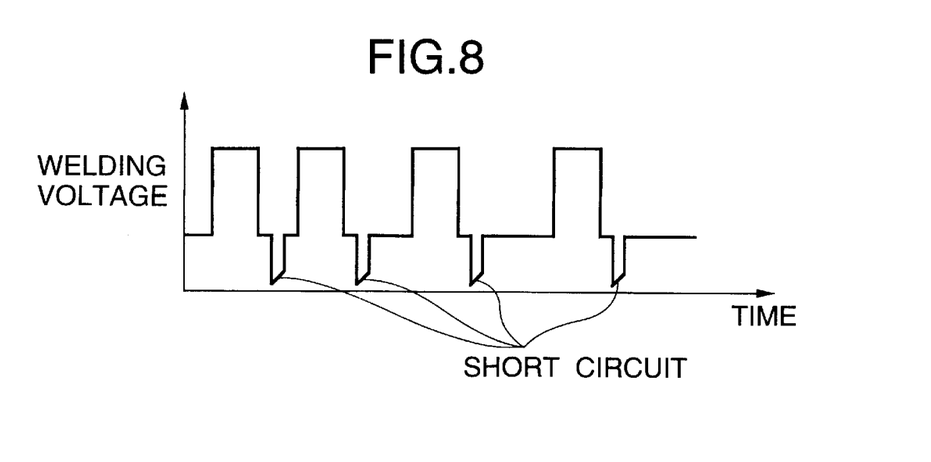
FIG. 8 is a waveform diagram showing a waveform of welding voltage in the case where welding is conducted under the condition that the welding voltage is reduced, by the consumable electrode type arc welding device to which the second method of controlling a pulse output of the present invention is applied.

Referring to FIGS. 2 and 8, the consumable electrode type pulse arc welding device to which the method of controlling a pulse output of the second invention is applied will be explained below. In this connection, like reference characters are used to indicate like parts in the conventional structure, the structure of Embodiment 1 and the structure of this embodiment, and the explanation is omitted here.

The consumable electrode type pulse arc welding device of the second embodiment includes: a main transformer 4 for supplying electric power to a welding load, having an auxiliary coil on the secondary side; a welding voltage detecting section 7 for detecting a welding voltage; a rectifying element 30 for rectifying an output of the main transformer; a welding voltage setting section 9 for setting a welding voltage; and an error amplifying section 8 for amplifying a difference between two inputs, one input being an output of the welding voltage detecting section 7 or an output of the rectifying element 30, the other input being an output of the welding voltage setting section 9, wherein an average welding voltage VOUT obtained by using the pulse period setting section 13 for setting a pulse period, also by using the pulse frequency setting section 11 for setting a pulse frequency used for the calculation of a peak current, and also by using at least one of the output of the welding voltage detecting section 7, the output of the rectifying element 30 and the output of the welding voltage setting section 9, a welding voltage VP in the peak period from the output of the welding voltage detecting section 7, and a welding voltage VB in the base period are detected by the voltage detecting section in the peak current calculating section 11 not shown in the drawing, and from an output PF of the pulse frequency setting section 11 for setting a pulse frequency and also from VOUT, VP and VB, the peak current is calculated by the calculating section in the peak current calculating section 22 not shown so that an average of the pulse frequency can not be changed. In this connection, VP and VB may not be given as detected values but they may be given as data. Concerning the calculation of the peak current, VP and VB may not be used. The peak current may not be set by calculation, but it may be set as a data table. A pulse output signal corresponding to a welding output is outputted from the pulse output setting section 10b into which an output of the error amplifying section 8 and an output of the pulse period setting section 13 are inputted. Either an output of the peak current calculating section 22 for setting a peak current or an output of the base current setting section 15 for setting a base current is switched by the switching circuit 12 according to an output of the pulse output setting section 10b.

FIG. 8 is a diagram showing a waveform of the welding voltage in the case where welding is conducted by the consumable electrode type pulse arc welding device of the second embodiment. The waveform of the welding voltage shown in FIG. 8 shows a welding voltage waveform in the case where the setting welding voltage is lowered from a welding condition of one pulse and one drop shown in FIG. 11, that is, a welding condition in which no short circuit occurs. These views are made on the assumption that the welding loads are the same. When it is assumed that the welding loads are changed, FIGS. 8 and 11 show a condition in which the pulse frequency of the welding voltage waveform is decreased.

Figure 5:
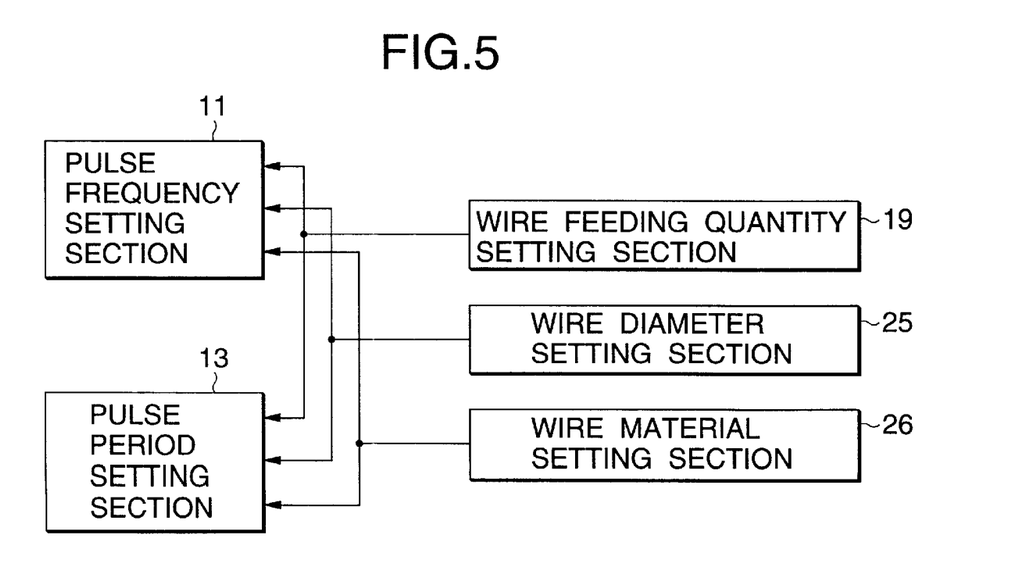
FIG. 5 is a circuit diagram showing an embodiment of the pulse period setting section and the pulse frequency setting section in the consumable electrode type arc welding device to which the method of controlling a pulse output of the present invention is applied.

In the case where the setting welding voltage is lowered from the condition shown in FIG. 11, it can be understood that the pulse frequency is the same as that before setting welding voltage is changed when the pulse period is reduced. In this case, the peak current is reduced to be shorter than the most appropriate value for one pulse and one drop. Therefore, it is impossible to provide a welding condition of one pulse and one drop. However, since a melting drop, the quantity of which is constant, is formed at a tip of a wire at each pulse, short circuit is caused each time the pulse period is ended. Therefore, a constant quantity of a melting drop is shifted from the tip of the wire to the base metal. That is, in the case where the welding voltage is lowered, a melting drop at the tip of the wire is not separated, however, a size of the melting drop which has been left at the tip of the wire becomes uniform. Therefore, the melting drop is regularly shifted from the tip of the wire to the base metal according to the short circuit which occurs after the end of the pulse period. Even when the welding voltage is lowered, an average of the pulse frequency is not changed. Therefore, a quantity of a melting drop which shifted from the tip of the wire to the base metal at each pulse is the same as that of the welding condition of one drop and one pulse, that is, the welding condition in which the welding voltage is high. Due to the foregoing, generation of spatter is suppressed and welding can be stabilized. As shown in FIG. 5, the pulse period setting section for setting a pulse period can be set according to at least one of the quantity of a wire to be fed, the diameter of the wire and the material of the wire. Therefore, it is possible to extend a range of setting. As shown in FIG. 5, the pulse frequency setting section for setting a pulse frequency of the consumable electrode type pulse arc welding device of the first and the second invention can be set according to at least one of the quantity of a wire to be fed, the diameter of the wire and the material of the wire. Therefore, it is possible to extend a range of setting.

(THIRD EMBODIMENT)

Figure 3:
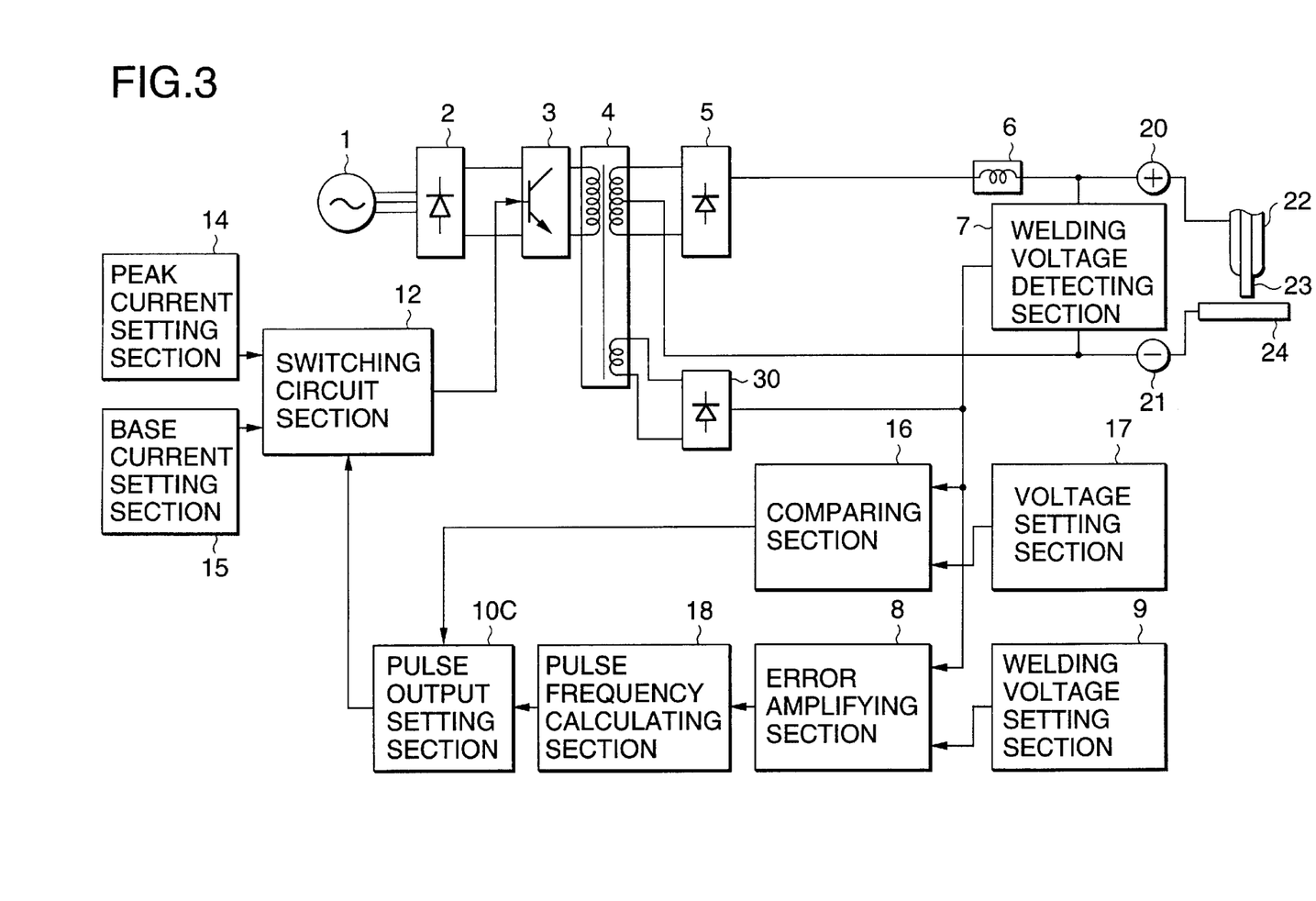
FIG. 3 is a circuit diagram showing an embodiment of the consumable electrode type arc welding device to which the third method of controlling a pulse output of the present invention is applied.
Figure 9:
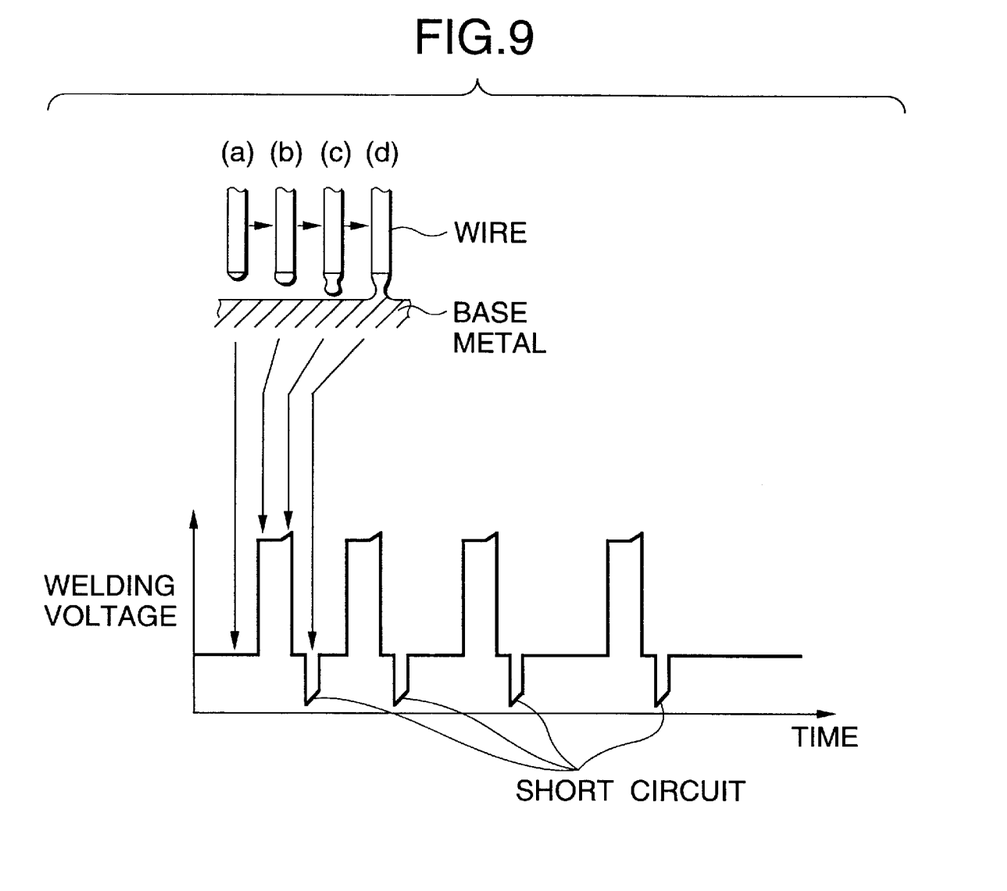
FIG. 9 is a view showing a state in which a melting drop is shifted and also a waveform diagram showing a waveform of welding voltage in the case where welding is conducted under the condition that the welding voltage is reduced, by the consumable electrode type arc welding device to which the third method of controlling a pulse output of the present invention is applied.

Referring to FIGS. 3 and 9, the consumable electrode type pulse arc welding device to which the method of controlling a pulse output of the third invention is applied will be explained below. In this connection, like reference characters are used to indicate like parts in the conventional structure, the structure of Embodiment 1, the structure of Embodiment 2 and the structure of this embodiment, and the explanation is omitted here.

The consumable electrode type pulse arc welding device of the third invention includes: a main transformer 4 for supplying electric power to a welding load, having an auxiliary coil on the secondary side; a welding voltage detecting section 7 for detecting a welding voltage; a rectifying element 30 for rectifying an output of the main transformer; a comparing section 16 for comparing an output of the welding voltage detecting section 7 with an output of the voltage setting section 17, the comparing section 16 outputting a melting drop separation predicting signal when the output of the welding voltage detecting section 7 exceeds the output of the voltage setting section 17; a welding voltage setting section 9 for setting a welding voltage; an error amplifying section 8 into which an output of the welding voltage detecting section 7 or an output of the rectifying element 30 and an output of the welding voltage setting section 9 are inputted, the error amplifying section 8 amplifying a difference between the above two inputs; a pulse frequency calculating section 18 for setting a pulse frequency, the pulse frequency calculating section 18 being inputted with an output of the error amplifying section 8; a pulse output setting section 10c into which an output of the comparing section 16 and an output of the pulse frequency calculating section 18 are inputted, the pulse output setting section 10c setting a pulse period when an output of the pulse frequency calculating section 18 is used as a pulse period starting signal and an output of the comparing section 16 is used as a pulse period ending signal; a peak current setting section 14 for setting a peak current; a base current setting section 15 for setting a base current; and a switching circuit section 12 for selecting either an output of the peak current setting section 14 or an output of the base current setting section 15 by an output of the pulse output setting section 10c.

FIG. 9 is a view showing a shift of a melting drop and also showing a waveform of a welding voltage in the case where welding is conducted by the consumable electrode type pulse arc welding device of the third invention. In the case shown in FIG. 9, the welding voltage is lowered compared with the case shown in FIG. 11. When it is shifted from the base period to the pulse period, a melting drop formed at a tip of a wire grows from (a) to (b) as shown in FIG. 9. Next, a constricted part is formed in the melting drop by an electromagnetic pinching force generated by the peak current so that the melting drop can be separated from the tip of the wire. Since constant current control is conducted in the pulse period, resistance is increased when the constricted part is formed in the melting drop. Therefore, the welding voltage is raised. When the rise of the welding voltage is compared with a predetermined voltage, it is possible to detect a time immediately before the separation of the melting drop from the tip of the wire. After that, the pulse period is ended. That is, when a constant quantity of melting drop is formed at the tip of the wire, the pulse period is ended. Therefore, after the end of the pulse period, short circuit is regularly generated, so that the melting drop is shifted as shown by (d) in FIG. 9. Due to the foregoing, the melting drop can be regularly shifted at each pulse, and a quantity of generated spatter can be reduced.

Figure 6:
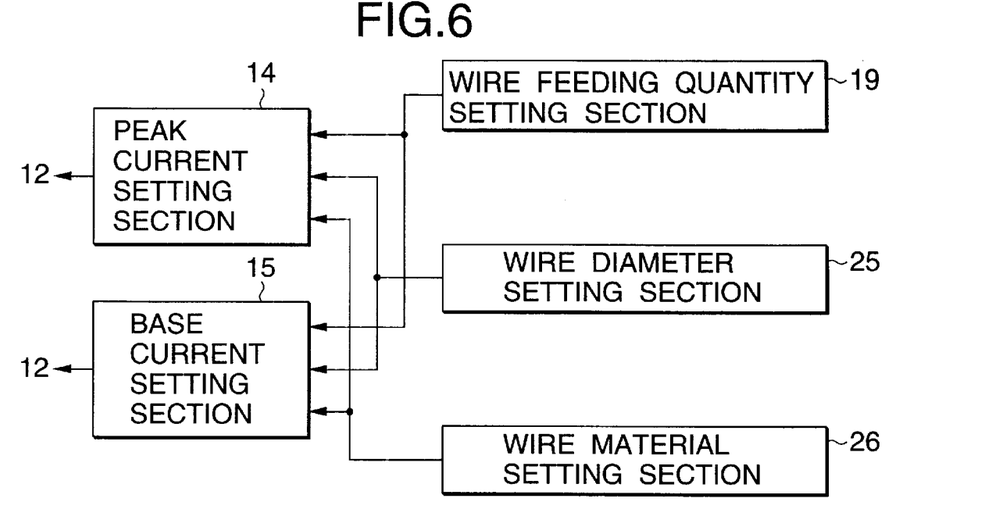
FIG. 6 is a circuit diagram showing an embodiment of the peak current setting section and the base current setting section in the consumable electrode type arc welding device to which the method of controlling a pulse output of the present invention is applied.

As shown in FIG. 6, in the consumable electrode type pulse arc welding device of the first, the second and the third invention, the base current setting section can be set according to at least one of the quantity of the wire to be fed, the material of the wire and the diameter of the wire. Therefore, the most appropriate value can be set at each of the quantity of the wire to be fed, the material of the wire and the diameter of the wire. Therefore, a range of setting can be extended.

As shown in FIG. 6, in the consumable electrode type pulse arc welding device of the first, the second and the third invention, the peak current setting section can be set according to at least one of the quantity of the wire to be fed, the material of the wire and the diameter of the wire. Therefore, the most appropriate value can be set at each of the quantity of the wire to be fed, the material of the wire and the diameter of the wire. Therefore, a range of setting can be extended.

The method of controlling a pulse output and the consumable electrode type pulse arc welding device of the present invention provide the following advantages. When the welding voltage is lowered, a size of each melting drop can be made uniform and short circuit can be regularly generated by shortening a pulse period or reducing a peak current. Due to the foregoing, it is possible to suppress the occurrence of spatter. When the peak period is ended by predicting the separation of a melting drop from a tip of a wire, in the same manner, a size of each melting drop can be made uniform and short circuit can be regularly generated.

What is claimed is:

1. A consumable electrode type pulse arc welding device comprising:
   a welding voltage detecting section for detecting a welding voltage;
   a welding voltage setting section for setting a welding voltage;
   a main transformer with an auxiliary coil on said main transformer secondary side for supplying electric power to a rectifying element;
   said rectifying element for rectifying an output of the main transformer for supplying electric power to a welding load;
   an error amplifying section for amplifying a difference between two inputs, one input being an output of the welding voltage detecting section or an output of the rectifying element, the other input being an output of the welding voltage setting section;
   a pulse frequency setting section for setting a pulse frequency;

a pulse output setting section for outputting a pulse output signal corresponding to a welding output from an output of the welding voltage detecting section or an output of the rectifying element, an output of the welding voltage setting section, an output of the pulse frequency setting section, and an output of the error amplifying section;

a peak current setting section for setting a peak current;

a base current setting section for setting the base current; and a switching circuit section for selecting either an output of the peak current setting section or an output of the base current setting section by an output of the pulse output setting section.

2. A consumable electrode type pulse arc welding device according to claim 1 further comprising: a wire feeding quantity setting section for setting a quantity of a wire to be fed; a wire diameter setting section for setting a diameter of the wire; a wire material setting section for setting a material of the wire; and a pulse output setting section which includes a limiter setting section for setting an upper limit and a lower limit of a pulse period according to at least one of a wire feeding quantity, a wire diameter and a wire material while an output of the wire feeding quantity setting section, an output of the wire diameter setting section and an output of the wire material setting section are used as an input.

3. A method of controlling a pulse output comprising the steps of:

feeding a peak current and a base current in regularly similar pulses between a welding wire and a welding base metal; and setting a peak current by using a pulse frequency setting and using at least one of: a welding output voltage, a signal corresponding to the welding output voltage, and a setting welding voltage.

4. A consumable electrode type pulse arc welding device comprising:

a welding voltage detecting section for detecting a welding voltage;

a welding voltage setting section for setting a welding voltage;

a main transformer with an auxiliary coil on said main transformer secondary side for supplying electric power to a rectifying element;

said rectifying element for rectifying an output of the main transformer for supplying electric power to a welding load;

an error amplifying section for amplifying a difference between two inputs, one input being an output of the welding voltage detecting section or an output of the rectifying element, the other input being an output of the welding voltage setting section;

a pulse period setting section for setting a pulse period;

a pulse frequency setting section for setting a pulse frequency used by a peak current calculating section to calculate a peak current;

a pulse output setting section for outputting a pulse output corresponding to a welding output while an output of the error amplifying section and an output of the pulse period setting section are used as an input;

said peak current calculating section for setting a peak current while an output of the welding voltage setting section, an output of the welding voltage detecting section, or an output of the rectifying element, an output of the pulse period setting section and an output of the pulse frequency setting section are used as an input;

a base current setting section for setting the base current; and a switching circuit section for selecting either an output of the peak current calculating section or an output of the base current setting section by an output of the pulse output setting section.

5. A consumable electrode type pulse arc welding device according to claims 1 or 4 further comprising: a wire feeding quantity setting section for setting a quantity of a wire to be fed; a wire diameter setting section for setting a diameter of the wire; a wire material setting section for setting a material of the wire; and a pulse frequency setting section for setting a pulse frequency to calculate a pulse period according to at least one of a wire feeding quantity, a wire diameter and a wire material while an output of the wire feeding quantity setting section, an output of the wire diameter setting section and an output of the wire material setting section are used as an input.

6. A consumable electrode type pulse arc welding device according to claim 4 further comprising: a wire feeding quantity setting section setting a quantity of a wire to be fed; a wire diameter setting section for setting a diameter of the wire; a wire material setting section for setting a material of the wire; and a pulse output setting section for setting a pulse period according to at least one of a wire feeding quantity, a wire diameter and a wire material while an output of the wire feeding quantity setting section, an output of the wire diameter setting section and an output of the wire material setting section are used as an input.

7. A consumable electrode type pulse arc welding device comprising:

a welding voltage detecting section for detecting a welding voltage;

a comparing section for outputting a melting drop separation predicting signal when an output of the welding voltage detecting section and an output of the voltage setting section are compared and calculated and the output of the welding voltage detecting section exceeds the output of the voltage setting section;

a welding voltage setting section for setting a welding voltage;

a main transformer with an auxiliary coil on said main transformer secondary side for supplying electric power to a rectifying element;

said rectifying element for rectifying an output of the main transformer for supplying electric power to a welding load;

an error amplifying section for amplifying a difference between two inputs, one input being an output of the welding voltage detecting section or an output of the rectifying element, the other input being an output of the welding voltage setting section;

a pulse frequency calculating section for setting a pulse frequency when an output of the error amplifying section is used as an input;

a pulse output setting section for outputting a pulse output signal corresponding to a welding output by using an output of the comparing section and an output of the pulse frequency calculating section as an input, also by using an output of the pulse frequency calculating section as a peak period starting signal and also by using an output of the comparing section as a peak period ending signal;

a peak current calculating section for setting a peak current;

a base current setting section for setting the base current; and a switching circuit section for selecting either an output of the peak current setting section or an output of the base current setting section by an output of the pulse period setting section.

8. A consumable electrode type pulse arc welding device according to claim 1, 4 or 7 further comprising: a wire feeding quantity setting section for setting a quantity of a wire to be fed; a wire diameter setting section for setting a diameter of the wire; a wire material setting section for setting a material of the wire; and a base current setting section for setting a base current according to at least one of a wire feeding quantity, a wire diameter and a wire material while an output of the wire feeding quantity setting section, an output of the wire diameter setting section and an output of the wire material setting section are used as an input.

9. A consumable electrode type pulse arc welding device according to claim 1 or 7 further comprising: a wire feeding quantity setting section for setting a quantity of a wire to be fed; a wire diameter setting section for setting a diameter of the wire; a wire material setting section for setting a material of the wire; and a peak current setting section for setting a peak current according to at least one of a wire feeding quantity, a wire diameter and a wire material while an output of the wire feeding quantity setting section, an output of the wire diameter setting section and an output of the wire material setting section are used as an input.

10. A method of controlling a pulse output comprising the steps of:

feeding a peak current and a base current in regularly similar pulses between a welding wire and a welding base metal;

setting an upper limit and a lower limit of a period of the pulse of current according to at least one of: a quantity of a wire to be fed, a diameter of the wire, and a material of the wire; and setting the period of the pulse of current by using at least one of: a welding output voltage, a signal corresponding to the welding output voltage, and a welding voltage setting.

11. A method of controlling a pulse output according to claim 10 further comprising the steps of:

setting a pulse frequency; and setting a period of the pulse of the current by using the pulse frequency setting and at least one of a welding output voltage, a signal corresponding to the welding output voltage, and a welding voltage setting.

12. A method of controlling a pulse output according to claims 10 or 11 further comprising the step of:

detecting a melting drop separation predicting signal for predicting a separation of a melting drop from a tip of a wire; and setting the period of the pulse of current by using this melting drop separation predicting signal as a signal to determine a time at which the pulse period of the current is ended.

13. A method of controlling a pulse output comprising the steps of:

feeding a peak current and a base current in regularly similar pulses between a welding wire and a welding base metal;

setting an upper limit and a lower limit of the period of the pulse of current according to at least one of: a quantity of wire to be fed, a diameter of the wire, and a material of the wire;

detecting a melting drop separation predicting signal for predicting separation of a melting drop from a tip of a wire; and setting the period of the pulse of current by using this melting drop separation predicting signal as a signal to determine a time as which the pulse period of the current is ended.

* * * * *

UNITED STATES PATENT AND TRADEMARK OFFICE
CERTIFICATE OF CORRECTION

PATENT NO. : 6,225,597 B1
DATED : May 1, 2001
INVENTOR(S) : Kawamoto et al.

Page 1 of 1

It is certified that error appears in the above-identified patent and that said Letters Patent is hereby corrected as shown below:

Title page,
Item [56], "References Cited, U.S. PATENT DOCUMENTS", please insert the following references:
-- 3,449,544   6/1969    Needham --
-- 4,301,355   11/1981   Kimbrough et al. --
-- 4,497,997   2/1985    Bodewig --
-- 4,620,082   10/1986   Graville et al. --
-- 4,758,707   7/1988    Ogilvie et al. --
-- 5,157,236   10/1992   Batzler et al. --
-- 5,834,732   11/1998   Innami et al. --
-- 6,008,470   12/1999   Zhang et al. --

Column 7,
Line 34, please delete "A".

Signed and Sealed this

Ninth Day of April, 2002

Attest:

*Attesting Officer*

JAMES E. ROGAN
*Director of the United States Patent and Trademark Office*